United States Patent [19]

Taniguchi et al.

[11] Patent Number: 5,786,781

[45] Date of Patent: Jul. 28, 1998

[54] ENCODER ANGLE DATA COMPUTATION METHOD AND COMPUTATION APPARATUS

[75] Inventors: Mitsuyuki Taniguchi, Oshino-mura; Hiroshi Yamaguchi, Higashishin-machi, both of Japan

[73] Assignee: Fanuc Ltd, Yamanashi, Japan

[21] Appl. No.: 817,428

[22] PCT Filed: Aug. 14, 1996

[86] PCT No.: PCT/JP96/02301

§ 371 Date: Apr. 14, 1997

§ 102(e) Date: Apr. 14, 1997

[87] PCT Pub. No.: WO97/07382

PCT Pub. Date: Feb. 27, 1997

[30] Foreign Application Priority Data

Aug. 17, 1995 [JP] Japan ................. 7-230707

[51] Int. Cl.$^6$ ................. G01D 5/245
[52] U.S. Cl. ................. 341/111; 341/115; 341/600
[58] Field of Search ................. 341/116, 117, 341/115, 111; 318/602, 600

[56] References Cited

U.S. PATENT DOCUMENTS

| | | | |
|---|---|---|---|
| 4,723,201 | 2/1988 | Tanamachi et al. | 363/41 |
| 5,068,777 | 11/1991 | Ito | 363/97 |
| 5,650,708 | 7/1997 | Sawada et al. | 318/801 |

FOREIGN PATENT DOCUMENTS

| | | |
|---|---|---|
| 3-68812 | 3/1991 | Japan. |
| 3-91914 | 9/1991 | Japan. |
| 6-61861 | 3/1994 | Japan. |
| 8-201110 | 8/1996 | Japan. |

OTHER PUBLICATIONS

"A Method of Improving the Resolution and Accuracy of Rotary Encoders Using Code Compensation Technique", Instrumentation and Measurement Technology Conference, Atlanta, May 14-16, 1991, No. Conf. 8, May 14, 1991, Institute of Electrical and Electronics Engineers, pp. 183-184.

Primary Examiner—Jeffrey A. Gaffin
Assistant Examiner—Peguy JeanPierre
Attorney, Agent, or Firm—Staas & Halsey

[57] ABSTRACT

An angle data computation apparatus, which comprises arithmetic means (4) for computing the angle data by considering the encoder signals in different phases as triangular-wave signals; correction data storage means (5) for storing correction data for correcting angle errors between the encoder signals and triangular-wave signals based on arithmetic data from the arithmetic means (4) serving as addresses; adder-subtracter means (6) for adding up the arithmetic data from the arithmetic means (4) and the correction data from the correction data storage means (5); and converter means (7) for converting the angle corresponding to the quadrant for the encoder signals.

9 Claims, 13 Drawing Sheets

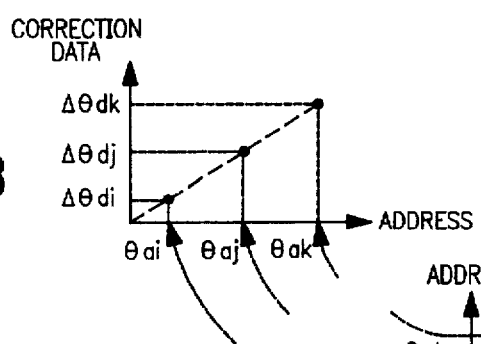
FIG. 4
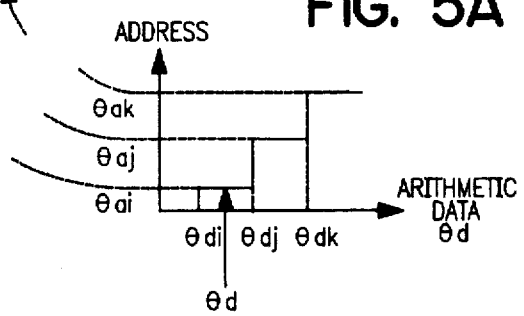
FIG. 5B
FIG. 5A

| QUADRANT | ANGLE DATA |
|---|---|
| FIRST QUADRANT (a>0, b>0) | $\theta$ |
| SECOND QUADRANT (a>0, b<0) | $\pi-\theta$ |
| THIRD QUADRANT (a<0, b<0) | $\pi+\theta$ |
| FOURTH QUADRANT (a<0, b>0) | $2\pi-\theta$ |

ENCODER ANGLE DATA COMPUTATION METHOD AND COMPUTATION APPARATUS

TECHNICAL FIELD

The present invention relates to a method and an apparatus for computing angle data for encoders, and a technique for interpolating detection signals in a detecting device for detecting the positions of a table and motor of a machine tool with an NC apparatus or the like.

BACKGROUND ART

A rotary pulse encoder, which is mounted on a motor shaft or the like, and a linear pulse encoder, which is attached to a worktable or the like, are known as detecting devices for detecting the positions of a table and motor of a machine tool with an NC apparatus, whereby the amount of movement and moving speed of a moving body are detected. Usually, in these pulse encoders, a phase-A signal, a sine-wave signal ($K\sin\theta$), and a phase-B signal, a sine-wave signal ($K\sin\theta \pm \pi/2$) with a phase difference of 90° from the phase-A signal, are generated as the moving body moves, and an interpolation signal is formed from these two sine-wave signals to obtain angle data, whereby the resolutions of positions and speeds are improved.

One such interpolation technique is known, in which sine-wave signals and cosine-wave signals from a signal source are supplied to a converter circuit that is composed of a plurality of resistors and a comparator array.

As another interpolation means, there is a known method in which angle data $\theta$ are obtained by inputting values a and b, obtained by A/D conversion of phase-A and phase-B sine-wave signals, to arithmetic means 4, as shown in FIG. 14, for computing $\tan^{-1}(a/b)$. The arithmetic operation of the inverse transform of this tangent is carried out by Taylor development calculation.

Moreover, another proposed interpolation technique is one comprising A/D converters and storage means such as a ROM. FIG. 15 is a block diagram for illustrating a conventional interpolating device using a storage element. In the interpolating device shown in FIG. 15, values a and b obtained by A/D conversion of phase-A and phase-B sine-wave signals are inputted to storage means 8 such as a ROM. The storage means 8 is stored with interpolated angle data, and outputs the angle data $\theta$ with digital signals from A/D converters 1 and 2 used as addresses.

FIG. 16 is a diagram showing relations between addresses and storage contents of the storage means in the conventional interpolating device provided with the A/D converters and the storage means. In FIG. 16, the axis of absciassa represents X-direction addresses, while the axis of ordinate represents Y-direction addresses. Each address corresponds to the values of sine and cosine waves converted into digital signals by the A/D converters. For example, when each address is represented by 8 bits, the value of each axis is represented by 256 addresses from 0 to 255. The storage contents are stored in positions corresponding to the individual lattices composed of the X- and Y-direction addresses. In FIG. 12, the portions loaded with the storage contents are hatched.

A circle shown in the drawing indicates position data represented by signals A and B, and the position data are fetched by appreciating the storage contents on a circle defined by addresses corresponding to the input signals A and B.

However, in the case where a converter circuit composed of resistors and a comparator array is used in the conventional interpolation technique, for example, the resistors and the comparator array pose problems such as a high cost and a large occupation space. Furthermore, in where $\tan^{-1}(a/b)$ is to be computed, there is a problem that the Taylor development calculation requires a complicated arithmetic circuit. In the case of an interpolating device provided with the A/D converters and the storage means, its storage contents must be previously loaded corresponding to all the addresses, so that large-capacity storage means is necessary.

DISCLOSURE OF THE INVENTION

The object of the present invention is to provide for an encoder angle data computation method and computation apparatus, capable of solving the aforementioned conventional problems, and capable of interpolating angle data by means of a simple arithmetic circuit and small-capacity storage means.

In order to achieve the above object, according to the present invention, a first angle is computed from two sine-wave encoder signal outputs in different phases by using an equation for obtaining an angle from two sine-wave signal outputs in different phases, and a second angle is computed by using an equation for obtaining an angle from the two triangular-wave signal outputs in different phases, whereby an angle error, the difference between the second angle and the first angle corresponding thereto, is previously stored in angle error data storage means, correspondingly to the second angle. During operation, two encoder signal outputs in different phases are obtained, and the second angle is obtained from these output data by means of angle computing means. Then, the first angle is obtained by adding the angle error, corresponding to the obtained second angle, to the second angle by means of adder-subtracter means.

Preferably, the two encoder signal outputs are obtained in the form of absolute values, and the second angle in the first quadrant is calculated from these output data, while the quadrant, whether first, second, third, or fourth, in which the first or second angle is located is discriminated by recognizing the respective signs, positive or negative, of the two encoder signal outputs, and the calculated second angle in the first quadrant is converted into an angle in the discriminated quadrant.

Further preferably, the angle error stored corresponding to the second angle is restricted so that the second angle ranges from 0 to $\pi/4$, and the angle error corresponding to a range of $\pi/4$ to $\pi/2$ for the second angle is obtained based on the angle error data within the range of 0 to $\pi/4$ for the stored second angle.

As described above, according to the present invention, two encoder signals A and B in different phases can be interpolated (divided) by first carrying out a simple calculation, $A/(A+B)$, without computing $\theta=\tan^{-1}(A+B)$ each time, and then fetching the angle error data previously stored in the storage element and adding it as correction data to the result of calculation. The quantity of data to be stored in the storage element can be made smaller.

BRIEF DESCRIPTION OF THE DRAWINGS

FIG. 4 is a table showing relations between addresses of correction data storage means and the correction data;

FIG. 5 is a diagram for illustrating the relations between the addresses of the correction data storage means and the correction data;

BEST MODE OF CARRYING OUT THE INVENTION

First, the principle of angle data computation according to the present invention will be described.

Figure 2A:
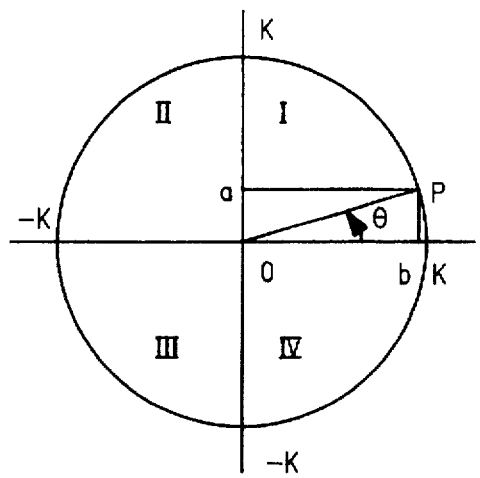
FIG. 2A is a diagram for illustrating the delivery of two sine-wave encoder signals in different phases.

A phase-A signal, that is, an output signal based on $a=K\sin\theta$, is obtained from a first encoder. A phase-B signal, that is, an output signal based on $b=K\sin(\theta+\pi/2)=K\cos\theta$, is obtained from a second encoder. As shown in FIG. 2A, the relations between an angle $\theta$ and the respective outputs a and b of the phase-A and phase-B signals can be represented by a circle with a radius K around a point of intersection between two rectangular coordinate axes. An ordinate-axis component of a line segment OP connecting the center O and one point P on the circle represents the output a of the phase-A signal, while an abscissa-axis component represents the output b of the phase-B signal. Further, the angle $\theta$ is an angle of the line segment OP as measured in the counter-clockwise direction from the abscissa-axis portion on the right of the origin O. The quadrant, whether first, second, third, or fourth, in which the point P is located is settled depending on the combination of the respective signs, positive or negative, of the outputs a and b.

In general, the angle $\theta$ ($0 \leq \theta < 2\pi$) is obtained by judgement as to whether the outputs a and b are positive or negative and calculation of $$\theta = \tan^{-1}(|a|/|b|). \quad (1)$$

According to the present invention, however, the rotational angle $\theta$ is not obtained directly from these outputs a and b according to the above equation (1). First, (a) it is determined whether a and b are positive or negative (or whether present angle $\theta$ is in first, second, third, or fourth quadrant), and (b) calculation is carried out for $$\theta d = \{|a|/(|a|+|b|)\} \cdot (\pi/2). \quad (2)$$

where $0 \leq \theta d < \pi/2$.

The above equation (2) is an equation for determining angle $\theta d$ from the encoder output values a and b when the outputs a and b are triangular-wave signals, individually. In most cases, therefore, the angle $\theta d$ obtained according to the above equation (2) is not equal to the angle $\theta$ ($0 \leq \theta < \pi/2$) obtained according to the foregoing equation (1). Hence, (c) a correction value equivalent to $\Delta\theta d = \theta - \theta d$ is given in advance in correlation with [$\theta d, \Delta\theta d$], and this $\Delta\theta d$ is added to the angle $\theta d$ obtained according to equation (b) ($\theta = \theta d + \Delta\theta d$).

However, (d) the corrected angle $\theta$ is to satisfy $0 \leq \theta d < \pi/2$, so that the true angle $\theta$ ($0 \leq \theta < \pi/2$) is obtained by adding quadrant information defined in (a) to the corrected angle.

Figure 2B:
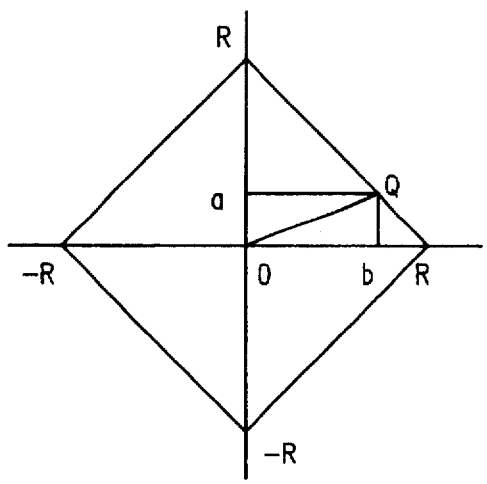
FIG. 2B is a diagram for illustrating the delivery of two triangular-wave encoder signals in different phases.

The angle determined by the triangular-wave signals a and b (a+b=R) can be illustrated by a line segment (square) that connects (R, O), (O, R), (-R, O), and (O, -R) on two rectangular coordinate axes, as shown in FIG. 2B. An ordinate-axis component of a line segment OQ connecting an intersection point O of the two axes and a point Q on that line segment represents a, while an abscissa-axis component represents b. Also, the product of the ordinate-axis component a of the line segment OQ and ($\pi/2$)/R is the angle $\theta d$ ($0 \leq \theta d < \pi/2$) to the axis of abscissa.

An embodiment of the present invention will be described on the premise mentioned above.

Figure 1:
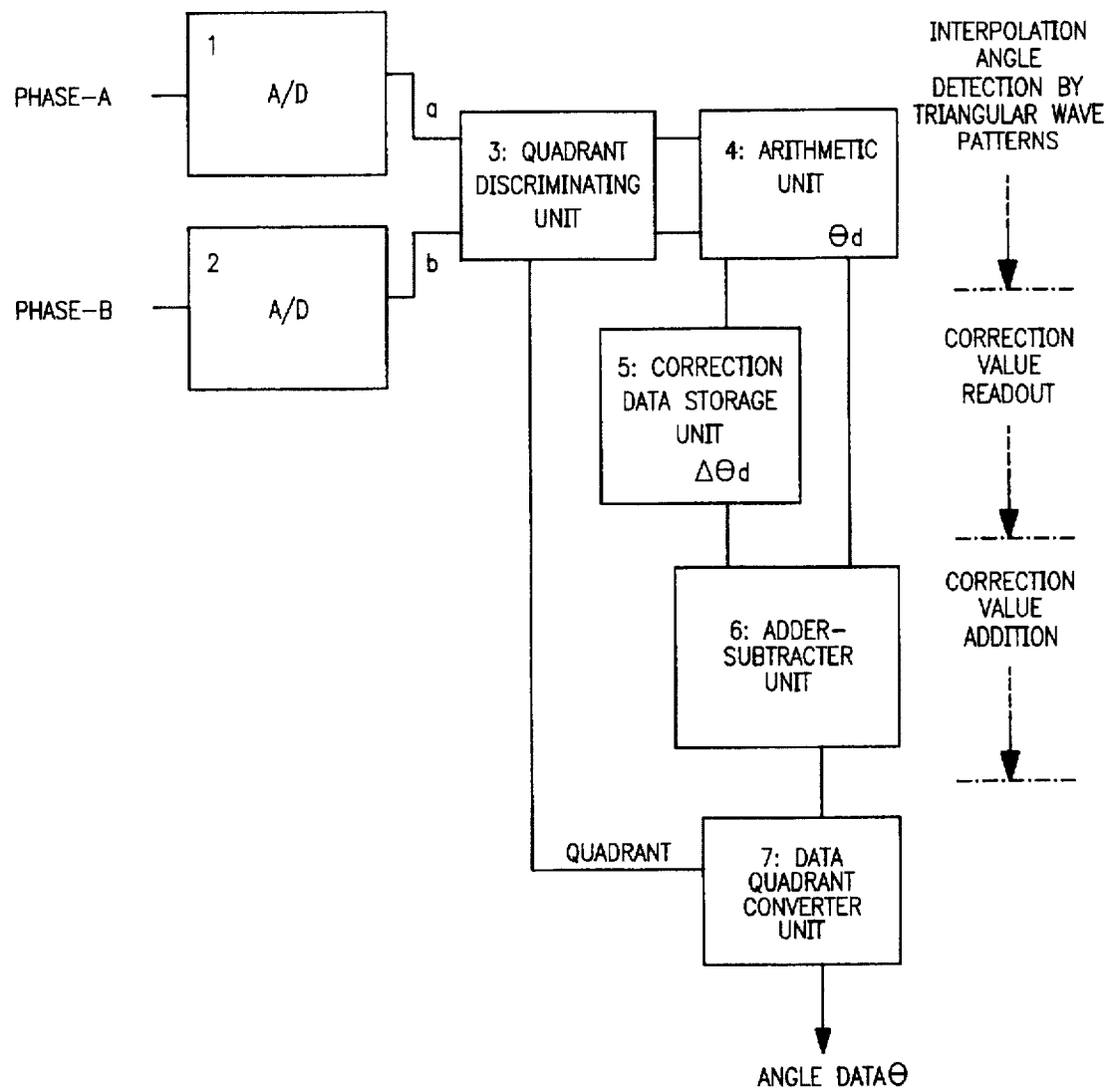
FIG. 1 is a block diagram for illustrating encoder angle data computation according to the present invention.

FIG. 1 is a block diagram for illustrating the encoder angle data computation according to the present invention. Referring to FIG. 1, phase-A and phase-B sine-wave signals differing in phase by $\pi/2$ are delivered from two encoders to A/D converter means 1 and A/D converter means 2, respectively. The A/D converter means 1 and 2 convert the inputted encoder signals into digital signals a and b, and apply them to quadrant discriminating means 3, individually. The quadrant discriminating means 3 discriminates one of the first to fourth quadrants to which the encoder signals belong depending on positive or negative of the inputted digital signals a and b.

The digital signals a and b are further applied to arithmetic means 4, and arithmetic data signals $\theta d$, which are assumed to be triangular-wave signals, are computed according to the aforementioned equation (2), that is, $\theta d = \{|a|/(|a|+|b|)\} \cdot (\pi/2)$ is calculated.

Correction data storage means 5 reads out correction data $\Delta\theta d$ (more specifically, $\Delta\theta d1, \Delta\theta d2, \Delta\theta d3, \Delta\theta d4, \ldots$) stored with addresses, which are the arithmetic data $\theta d$ (more specifically, $\theta d1, \theta d2, \theta d3, \theta d4, \ldots$) computed by the arithmetic means 4, and delivers them to adder-subtracter means 6. The adder-subtracter means 6 adds up arithmetic data $\theta dj$ and correction data $\Delta\theta dj$ ($\theta dj + \Delta\theta dj$), thereby correcting errors resulting from assuming the signals to be the triangular-wave signals. Since this ($\theta dj + \Delta\theta dj$) is an angle formed when the encoder signals are in the first quadrant, it is converted into an angle corresponding to the quadrant to which the encoder signals belong, in response to a quadrant signal from quadrant discriminating means 3.

Described in the following is angle errors between sine-wave signals and triangular-wave signals and the correction data $\Delta\theta d$ for correcting the angle errors.

With respect to the first quadrant ($a \geq 0$, $b \geq 0$), the angle signal $\theta$ obtained on the bases of the phase-A and phase-B sine-wave signals delivered from the first and second encoders, according to the aforementioned equation (1), is given by $$\theta = \tan^{-1}(a/b).$$

On the other hand, the angle θd calculated with the phase-A and phase-B signals regarded as triangular-wave signal outputs is $$\theta d = \{a/(a+b)\} \cdot (\pi/2),$$

so that the angle errors Δθd are given by $$\Delta\theta d = \theta - \theta d \qquad (3)$$
$$= \tan^{-1}(a/b) - \{a/(a+b)\} \cdot (\pi/2).$$

where

|a|=A,
|b|=B,
then θd=(A/(A+B))·(π/2) (See Equation (2))
(A+B)·θd=(π/2)·A
B·θd=((π/2)·A)=(A·θd)
B·θd=A((π/2)−θd)
therefore A/B=θd/((π/2)−θd)
however,
θ=tan⁻¹(A/B) (See Equation (1))
therefore
Δθd=θ−θd (See Equation (3))

$$\Delta\theta d = \tan^{-1}(\theta d/((\pi/2)-\theta d)) - \theta d \qquad (3)'$$

according to Equation (3)'.

Δθd is determined by θd.
With respect to this Δθd:
Δθd=0 when θ=0, and thus the value of the phase-A signal is represented by a=Ksinθ=0;
Δθd=π/4−π/4=0 when θ=π/4, and thus the value of the phase-A signal, a=Ksinθ, and the value of the phase-B signal, b=Kcosθ, are equal, that is, when a=b;
Δθd=π/2−π/2=0 when the values of the phase-A and phase-B signals are a=Ksinθ=K and b=Kcosθ=0, respectively;
when the angle changes from θ (0<θ<π/4) into [π/2−θ], while the value of the phase-A signal changes from a into b, while the value of the phase-B signal changes from b into a, so that the angle errors Δθd in this case are written as follows by replacing a with b and b with a in the aforementioned equation (3).

$$\Delta\theta d = \tan^{-1}(b/a) - \{b/(a+b)\} \cdot (\pi/2) \qquad (4)$$
$$= \pi/2 - \tan^{-1}(a/b) - \{1 - [a/(a+b)]\} \cdot (\pi/2)$$
$$= -\tan^{-1}(a/b) + \{a/(a+b)\} \cdot (\pi/2).$$

Figure 2C:
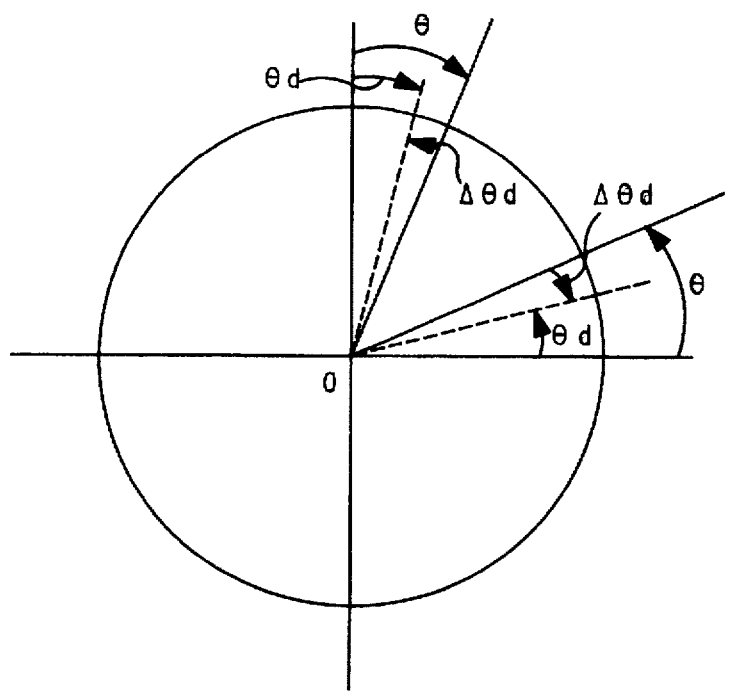
FIG. 2C is a diagram for illustrating angle errors according to the present invention.

The above equation (4) indicates that the angle errors when the angle is θ (0<θ<π/4) and the angle errors when the angle is [π/2−θ] have equal absolute values and opposite signs. FIG. 2C is a diagram illustrating these facts.

As is obvious from FIG. 2C, the angle errors Δθd when the angle obtained according to the aforementioned equation (2) is θd (0≤θd≤π/4) and the angle errors Δθd when the angle is [π/2−θd] have opposite signs and equal absolute values. Thus, the angle errors Δθd corresponding to angles within the range of π/4≤θd≤π/2 can be detected by previously obtained the correlations between the angles θd and the angle errors Δθd within the range 0≤θd≤π/4 by calculation or the like. That is, all the angle errors Δθd where 0≤θd≤π/2 (first quadrant) can be determined. These values can be obtained in like manner for other quadrants.

Figure 3A:
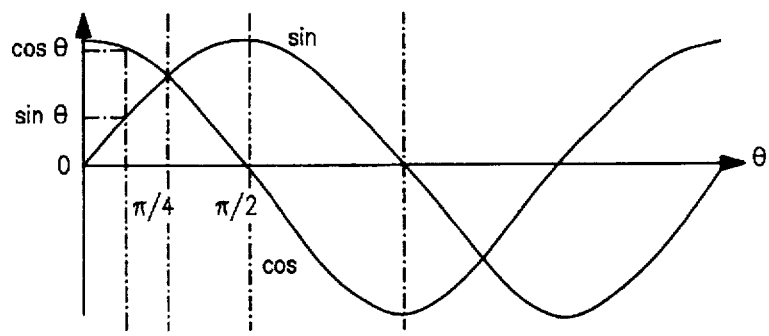
FIG. 3 is a signal diagram showing relations between sine-wave signals, triangular-wave signals, and correction data.
Figure 3B:
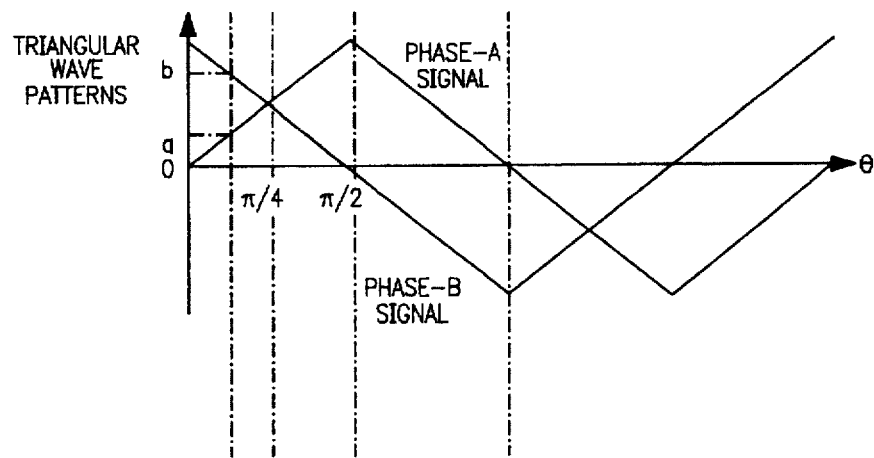
Figure 3C:
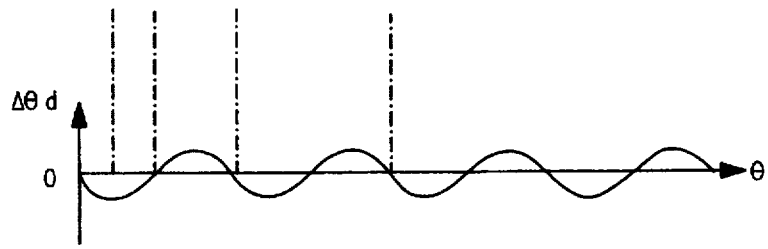

FIG. 3 is a signal diagram showing relations among the sine-wave signals, triangular-wave signals, and correction data. In FIG. 3, (a), (b) and (c) illustrate the sine-wave signals, triangular-wave signals, and angle errors Δθd, respectively. The angle errors Δθd are signals with a cycle of π/2, and are symmetrical with respect to a center point corresponding to π/4.

Described in following is the correction data storage means 5 for storing the angle errors Δθd as correction data. In the description to follow, the angle errors Δθd will be referred to as "correction data".

The correction data storage means 5 can be formed of a storage element such as a ROM, and stores the correction data Δθd with the arithmetic data Δd computed by the arithmetic means 4, which serves as addresses. FIG. 4 shows relations between addresses θa of the correction data storage means 5 and the correction data Δθd. The addresses θa are loaded individually with the correction data Δθd.

FIG. 5 shows relations between the addresses θa and the correction data Δθd. In FIG. 5, (a) represents relations of the addresses θa to the arithmetic data θd, while (b) represents relations of the correction data Δθd to the addresses θa. As shown in FIGS. 4 and 5, the addresses θa are set as discrete values of θa1, θa2, . . . , θai, θaj, θak, . . . , for example. On the other hand, the arithmetic data θd may take some other values than aforesaid discrete values, according to the aforementioned equation (2). Thus, one of the addresses θa is made to correspond to the arithmetic data θd in a certain range, as shown in FIG. 5(a), the correction data Δθd are made to correspond to the addresses θa in a one-to-one fashion, as shown in FIG. 5(b), and the correction data θΔd are stored corresponding individually to the addresses, as shown in FIG. 4.

Figures 6, 7:
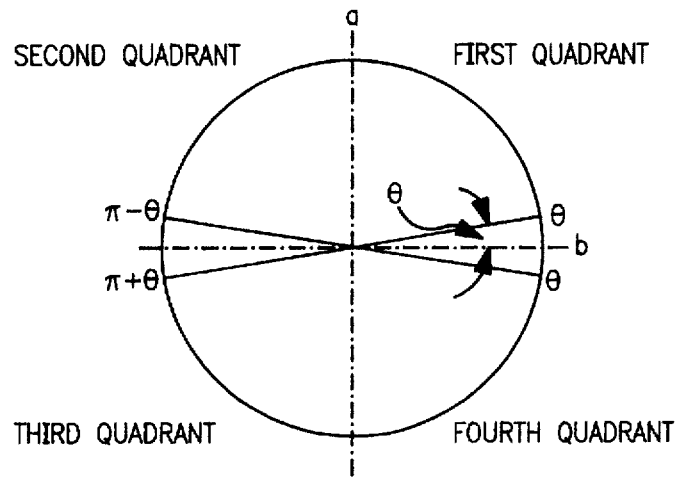
FIG. 6 is a diagram for illustrating quadrant conversion.
FIG. 7 is a diagram showing relations between quadrants and angle data.

The arithmetic data θd and the correction data Δθd added together by the adder-subtracter means 6 are signals are in any other quadrant, data quadrant converter means 7 converts the quadrant in response to the quadrant signal obtained from the quadrant discriminating means 3. FIG. 6 is a diagram for illustrating this quadrant conversion. Thus, in the case of FIG. 6, when the angle in the first quadrant is θ, angular relations are established so that (π−θ), (π+θ), and 2π−θ are given in the second, third, and fourth quadrants, respectively. FIG. 7 shows relations between the quadrants and the angle data. Thus, in the case where the signals a and b from the encoder are given, for example, based on a>0 and b>0, respectively, the quadrant discriminating means 3 concludes that the encoder signals are in the first quadrant, and the data quadrant converter means 7 outputs the angle data θ. On the other hand, when the signals a and b are given based on a>0 and b<0, respectively, the quadrant discriminating means 3 concludes that the encoder signals are in the second quadrant, and the data quadrant converter means 7 outputs the angle data (π−θ). In the case where the signals a and b are given based on a<0 and b<0, respectively, the quadrant discriminating means 3 concludes that the encoder signals are in the third quadrant, and the data quadrant converter means 7 outputs the angle data (π+θ). On the other hand, when the signals a and b are given based on a<0 and b>0, respectively, the quadrant discriminating means 3 concludes that the encoder signals are in the fourth quadrant, and the data quadrant converter means 7 outputs the angle data (2π−θ).

According to the above embodiment, the correction data storage means 5 is stored with the correction data Δθd corresponding to the addresses θa for angles from 0 to π/2 in the first quadrant, and the capacity required for storage can be reduced by utilizing the symmetric characteristic of the correction data $\Delta\theta d$.

Figure 8:
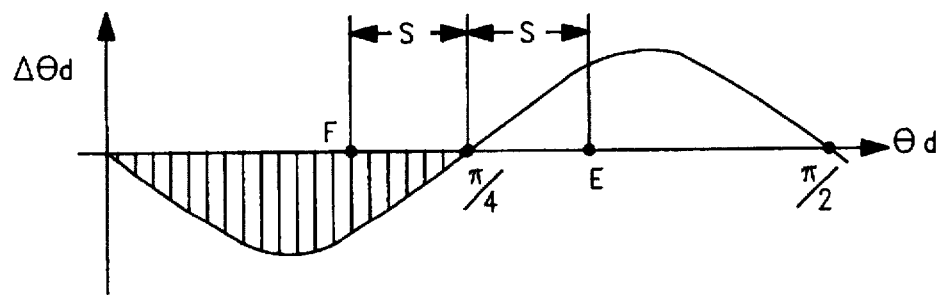
FIG. 8 is a diagram for illustrating the reduction of the capacity of the correction data.

Referring now to FIG. 8, the reduction of the storage capacity required for the correction data $\Delta\theta d$ will be described.

The correction data $\Delta\theta d$ corresponding to the addresses for angles from 0 to $\pi/4$ are prepared, and (a) the correction data $\Delta\theta d$ having the address $\theta a$ corresponding to the output $\theta d$ of the arithmetic means 4 is fetched when $\theta d$ is given as $0 \leq \theta d < \pi/4$, and (b) the correction data $\Delta\theta d$ having the address $\theta a$ corresponding to $[\pi/2 - \theta d]$ is fetched, and its sign is inverted when $\theta d$ is given as $\pi/4 \leq \theta d < \pi/2$.

Referring to FIG. 8, the case (b) will be described When the output $\theta d$ is on a point E (at a distance s of positive movement from the point for $\pi/4$), the correction data $\Delta\theta d$ having an address indicated by a point F (at a distance s of negative movement from the point for $\pi/4$) is fetched, and its sign is inverted.

The following is a description of another embodiment of correction data computation according to the present invention. In the case of the previously described embodiment, the correction data for correcting the errors is calculated by being compared with the triangular-wave signals on the premise that input signals are sine-wave signals. The correction data are unnecessary if the input signals are triangular-wave signals. Thus, in the case where the input signals are sine-wave signals, the errors between the sine-wave signals and the triangular-wave signals are corrected by means of the computed correction data, and angle signals are computed as the triangular-wave signals.

In contrast with this, the following embodiment is a case in which the input signals are periodic signals whose magnitudes, like those of the sine-wave signals or triangular-wave signals, change with the angle, although the waveforms are neither those of sine-wave signals nor those of triangular-wave signals. The interpolation of the angle data in these synchronizing signals with arbitrary waveforms will be discussed in the following.

Figure 9A:
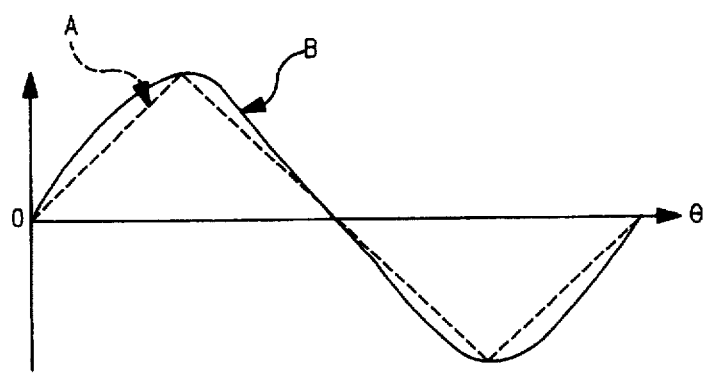
FIGS. 9A to 9C are diagrams for illustrating relations between encoder signals and triangular-wave signals.

FIG. 9A shows the relation between a sine-wave signal A and a triangular-wave signal B. The correction data computed according to the foregoing embodiment are data for correcting the input waveform of the sine-wave signal B into the triangular-wave signal A, and the correction data are based on the premise that the input waveforms are those of triangular-wave signals.

Figure 9B:
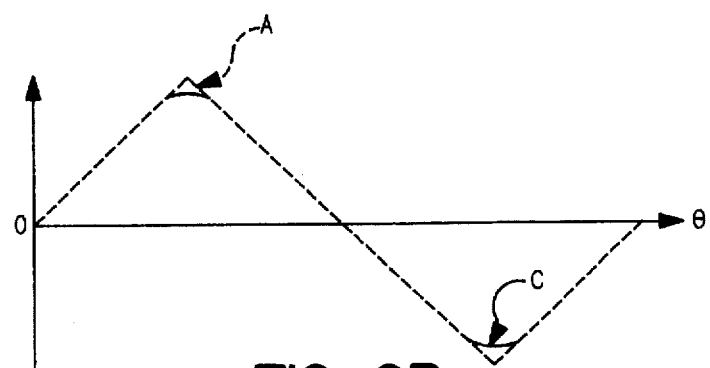
Figure 9C:
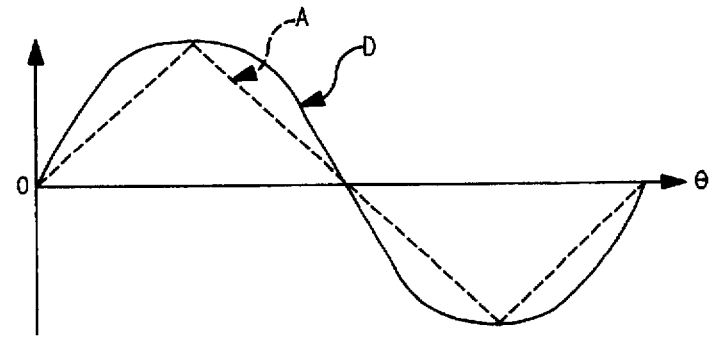

Signal waveforms delivered from actual encoders, compared with these triangular-wave signals, are not always those of sine-wave signals. For example, in an optical encoder that detects angles on the basis of changes in the quantity of transmitted light caused by relative movement of stationary and moving slits, the quantity of light applied to a light receiver varies due to leakage of light or the like, so that ideal triangular-wave signals cannot be obtained. For example, synchronizing signals, neither triangular-wave signals nor sine-wave signals, are obtained, as indicated by dashed line C in FIG. 9B or two-dot chain line D in FIG. 9C.

A satisfactory correction effect cannot be obtained if the correction data based on input waveforms of sine-wave signals are applied to the signals with arbitrary waveforms. In this embodiment, therefore, the correction data obtained on the basis of the sine-wave signals are used, and correction data capable of producing a satisfactory correction effect are made available by adjusting those correction data.

Figure 10:
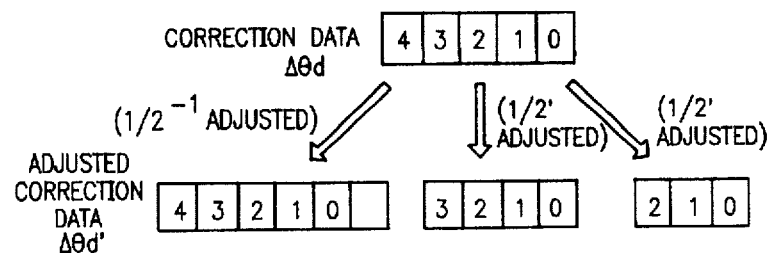
FIG. 10 is a diagram for illustrating the adjustment of the correction data.

In this embodiment, as shown in FIG. 10, the correction data $\Delta\theta d$ obtained on the basis of a sine-wave signal is multiplied by $\frac{1}{2}^n$, whereupon adjusted correction data $\Delta\theta d'$ are obtained. In FIG. 10, the correction data $\Delta\theta d$ is 5-bit binary data including data 0, 1, 2, 3 and 4. The data length of this correction data is not limited to five bits and may be adjusted to any number of bits. Hereinafter, this data will be represented in the display format of [4, 3, 2, 1, 0].

In general, binary data increases or decreases by $\frac{1}{2}$ or a multiple of 2 at a time when its numerical value is changed by the unit of bit. For instance, if the correction data $\Delta\theta d$ [4, 3, 2, 1, 0] is shifted toward the LSB by one bit, correction bits $\Delta\theta d'$ [3, 2, 1, 0], which is equivalent to the product of the correction data $\Delta\theta d$ and $\frac{1}{2}$ ($=\frac{1}{2}^1$), is obtained. If the correction data is shifted toward the LSB by two bits, correction data $\Delta\theta d'$ [2, 1, 0], which is equivalent to the product of the correction data $\Delta\theta d$ and $\frac{1}{4}$ ($=\frac{1}{2}^2$), is obtained. In contrast, if the correction data is shifted toward the MSB by one bit, correction data $\Delta\theta d'$ [4, 3, 2, 1, 0, 0], which is equivalent to the product of the correction data $\Delta\theta d$ and 2 ($=\frac{1}{2}^{-1}$), is obtained.

The degree of data correction is calculating the angle data from the input waveforms can be adjusted by using the correction data $\Delta\theta d'$ adjusted by the aforesaid arithmetic operation. For example, in the case where the input waveforms are those of triangular-wave signals, the correction data $\Delta\theta d$ is directly used without adjusting the correction data $\theta d$.

On the other hand, in the case where the input waveforms resemble those of triangular-wave signals, the extent of adjustment of the correction data $\Delta\theta d$ by means of the correction data $\Delta\theta d'$ [3, 2, 1, 0], based on the multiplication by $\frac{1}{2}$ ($=\frac{1}{2}^1$), can be reduced by arithmetic operation such that the correction data $\Delta\theta d$ is shifted toward the LSB by one bit. Further, in the case where the input waveforms are more similar to those of triangular-wave signals more and require a lower degree of correction, the extent of adjustment of the correction data $\Delta\theta d$ by means of the correction data $\Delta\theta d'$ [2, 1, 0], based on the multiplication by $\frac{1}{4}$ ($=\frac{1}{2}^2$), can further be reduced by arithmetic operation such that the correction data $\Delta\theta d$ is shifted toward the LSB by two bits.

Further, in the case where the input waveforms are ones obtained by flattening the top and bottom peak portions of sine-wave signals and more similar to rectangular waves more, the extent of adjustment of the correction data $\Delta\theta d$ by means of the correction data $\Delta\theta d'$ [4, 3, 2, 1, 0, 0], based on the multiplication by 2 ($=\frac{1}{2}^{-1}$), is increased by arithmetic operation such that the correction data $\Delta\theta d$ is shifted toward the MSB by one bit.

The extent of adjustment of the correction data is not limited to $\frac{1}{2}$ or multiples of 2, and these multiples may be combined to obtain various multiplication factors, such as $\frac{3}{4}$ ($=\frac{1}{2}+\frac{1}{4}$).

The adjustment of the correction data can be made by moving the bits of the correction data represented by binary numbers, as mentioned before. These bits can be moved by either hardware or software means, and the extent of adjustment can be selected by using any available means in accordance with the input waveforms. For example, selection signals may be externally inputted in accordance with the input waveforms so that the movement amount of the bits can be changed, and the extent of adjustment can be selected.

Figure 11:
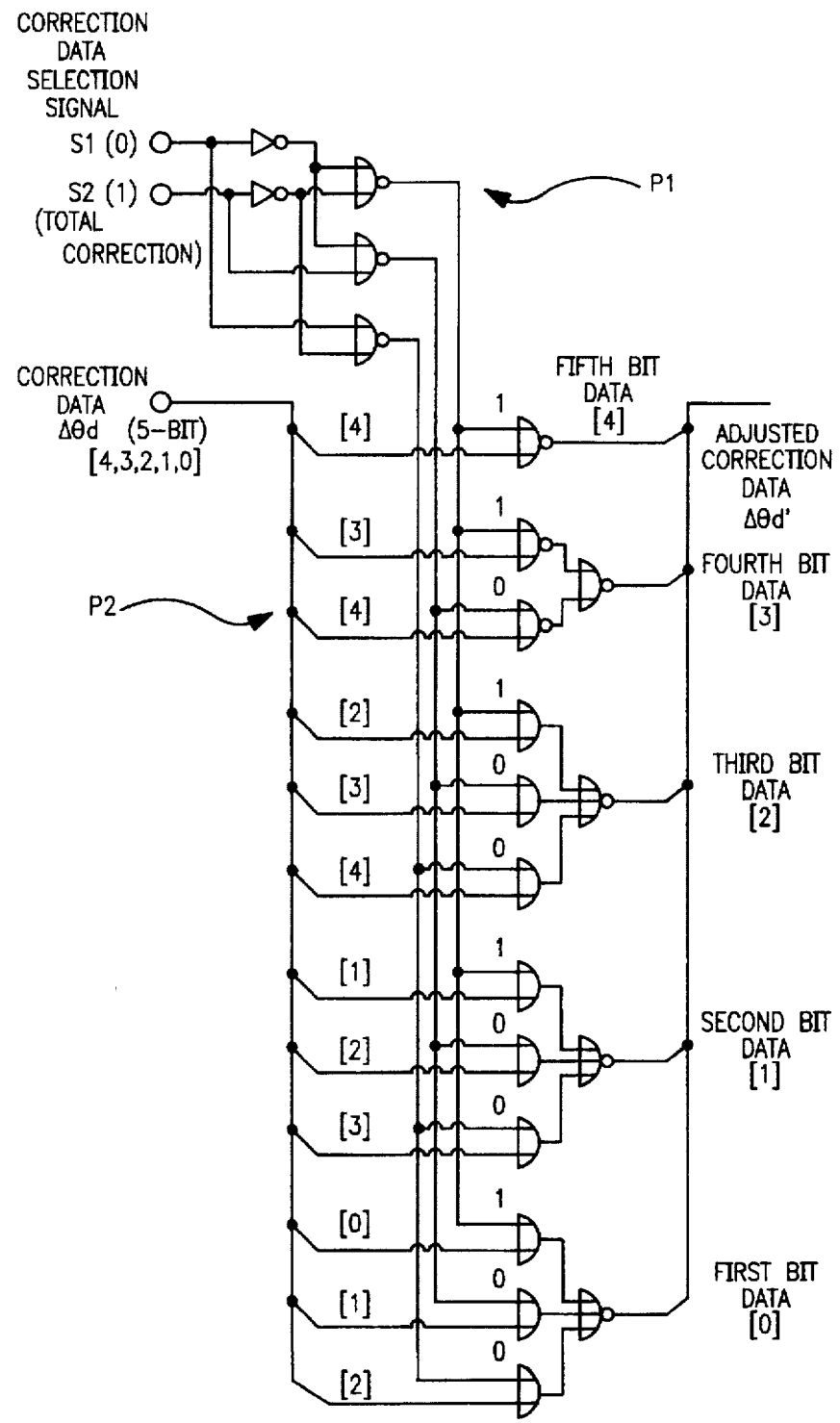
FIGS. 11 to 13 show showing examples of circuit configurations for adjusting the correction data.
Figure 12:
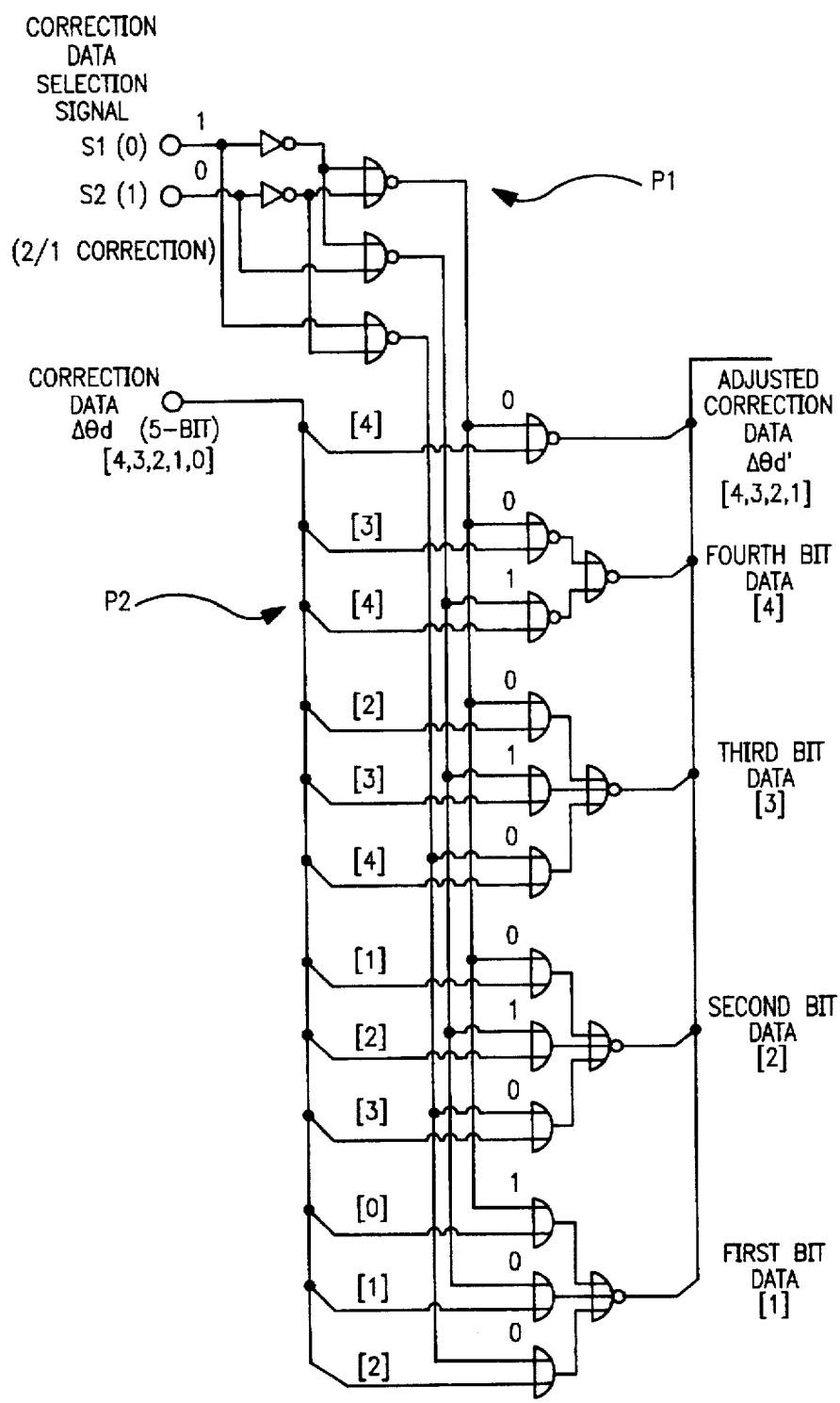
Figure 13:
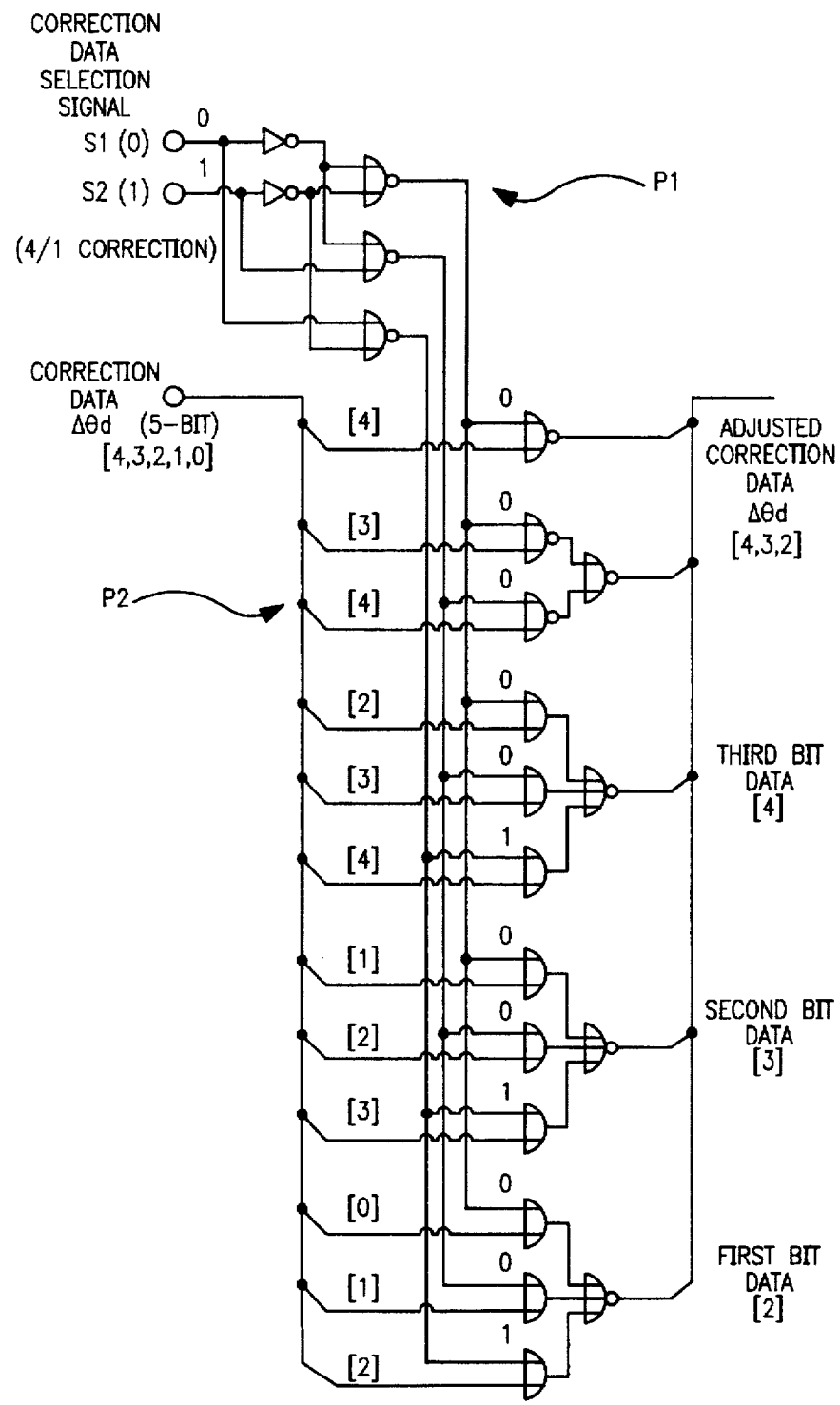
Figure 14:
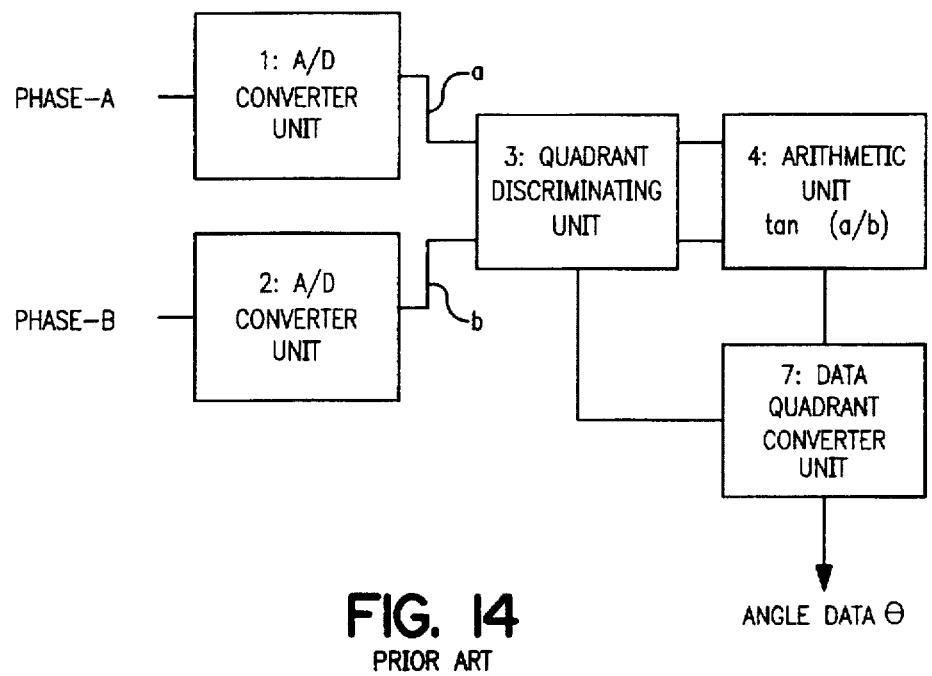
FIG. 14 is a diagram for illustrating the computation of angle data according to conventional arithmetic operation.
Figure 15:
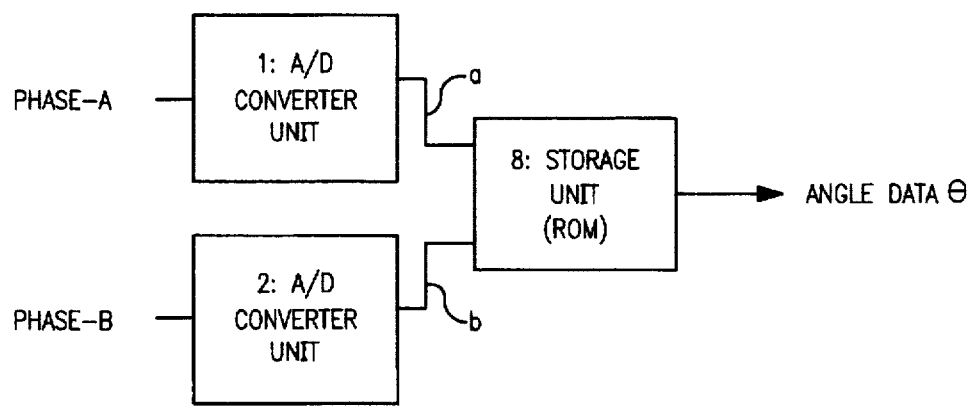
FIG. 15 is a block diagram for illustrating a conventional interpolating device using a storage element.
Figure 16:
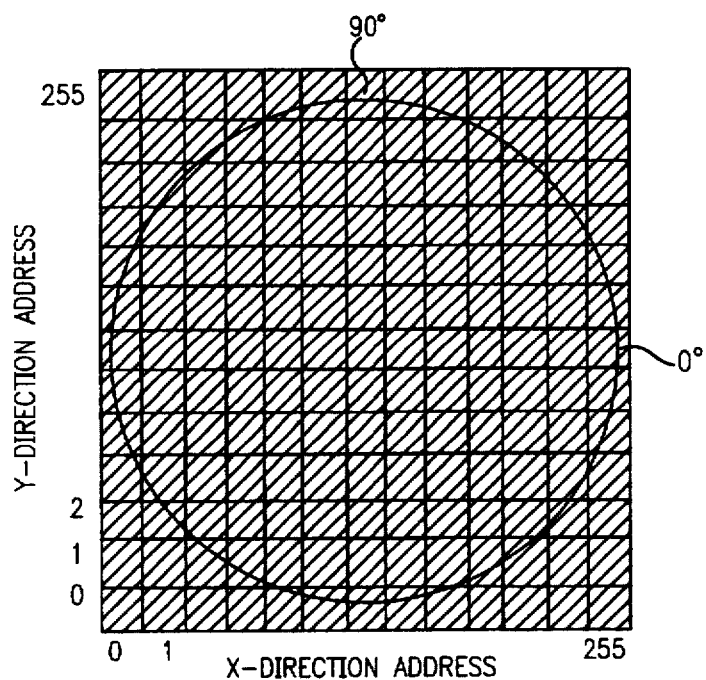
FIG. 16 is a diagram showing relations between addresses and storage contents of the storage means in a conventional interpolating device provided with A/D converters and the storage means.

Referring now to FIGS. 11 and 13 showing examples of circuits, a case in which the extent of adjustment of the correction data is selected by means of hardware will be described. The circuit of FIG. 11 represents a case in which all the correction data are used without being adjusted (hereinafter referred to as total correction), the circuit of FIG. 12 represents a case in which the half the value of the correction data is to be used with the correction data multiplied by ½ for adjustment (hereinafter referred to as ½ correction), and the circuit of FIG. 13 represents a case in which ¼ of the value of the correction data is to be used with the correction data multiplied by ¼ for adjustment (hereinafter referred to as ¼ correction).

In FIGS. 11 to 13, a portion P1 is a circuit portion that forms signals for selecting the correction data, and P2 is a circuit portion that selects the correction data for adjustment in response to correction data selection signals. Signals S1 and S2 are applied to the correction data selection signal generating portion P1, whereby selection signals for adjusting four types of correction data can be formed. Further, the correction data θd obtained in the aforementioned manner are applied to the correction data selecting portion P2. Bit data for each bit of the correction data Δθd is selected in accordance with a selection signal from the correction data selection signal forming portion P1, and is outputted as adjusted correction data Δθd'. FIGS. 11 to 13 show cases in which 5-bit data [4, 3, 2, 1, 0] is inputted as the correction data Δθd.

FIG. 11 shows a case in which the total correction data is selected. When "1" is applied to the signals S1 and S2, the correction data selecting portion P2 selects data for each bit of the correction data Δθd, and data for all bits, first bit to fifth bit, are delivered to the data terminals. Thereupon, all data of the correction data Δθd can be selected.

FIG. 12 shows a case for the ½ correction. If "1" and "0" are applied to the signals S1 and S2, respectively, the correction data selecting portion P2 selects data for the individual bits, except the LMS bit, of the correction data Δθd, and delivers 4-bit data, first bit fourth bit, to the data terminals. By doing so, the half of the value of the correction data Δθd can be selected.

Further, FIG. 13 shows a case for the ¼ correction. If "0" and "1" are applied to the signals S1 and S2, respectively, the correction data selecting portion P2 selects data for the individual bits, except the LMS bit and next bit, of the correction data Δθd, and delivers 3-bit data, first bit to third bit, to the data terminals. By doing so, ¼ of the value of the correction data Δθd can be selected.

As discussed in the foregoing, according to the present invention, there can be provided an encoder angle computation method and computation apparatus, in which the angle data can be interpolated by means of a simple arithmetic circuit and small-capacity storage means.

We claim:

1. An angle data computation method for an encoder, comprising steps of:
   (a) computing a first angle from two sine-wave encoder signal outputs in different phases by using an equation for obtaining an angle from two sine-wave signal outputs in different phases, and computing a second angle by using an equation for obtaining an angle from two triangular-wave signal outputs in different phases, thereby previously storing an angle error, the difference between the second angle and said first angle corresponding thereto, correspondingly to the second angle;
   (b) obtaining two encoder signal outputs in different phases and determining said second angle based on said data; and
   (c) obtaining said first angle by adding said angle error, corresponding to said obtained second angle, to the second angle.

2. An angle data computation method for an encoder according to claim 1, wherein said two encoder signal outputs are obtained in the form of absolute values, and the second angle in the first quadrant is calculated from these data, while the quadrant, whether first, second, third, or fourth, to which said first or second angle belongs, is discriminated by recognizing the respective signs, positive or negative, of the two encoder signal outputs, and said calculated second angle in the first quadrant is converted into an angle in said discriminated quadrant.

3. An angle data computation method for an encoder according to claim 2, wherein said angle error of said (a) stored corresponding to the second angle is defined to be within a range from 0 to π/4, and the angle error corresponding to a range of π/4 to π/2 for the second angle is obtained by using angle error data for the range of 0 to π/4 for the second angle.

4. An angle data computation method for an encoder according to claim 1, wherein said second angle serves as an address when the angle error is stored corresponding to the second angle in said (a).

5. An angle data computation method for an encoder according to claim 1, wherein said angle error to be added in said (c) is not the angle error stored, in said (a), itself but is adjusted corresponding to a deviation from the sine wave of the encoder signals.

6. An angle data computation method for an encoder according to claim 5, wherein said adjustment is made by increasing or decreasing said stored angle error based on a multiplication factor of $2^n$ (n is a positive or negative integer) or a combination of $2^n$.

7. An angle data computation apparatus for an encoder, comprising:
   angle error data storage means for storing an angle error, the difference between a first angle, calculated from two sine-wave encoder signal outputs in different phases by using an equation for obtaining an angle from two sine-wave signal outputs in different phases, and a second angle, calculated from said two sine-wave encoder signal outputs by using an equation for obtaining an angle from two triangular-wave signal outputs in different phases, correspondingly to said second angle;
   angle computing means for receiving the input of two encoder signals in different phases and computing and outputting said second angle based on said input signals by using an equation for obtaining an angle from two triangular-wave signal outputs in different phases;
   adder means for obtaining said first angle by adding the angle error, corresponding to the second angle and stored in said angle error data storage means, to the second angle computed by said angle computing means.

8. An angle data computation apparatus for an encoder according to claim 7, wherein said angle computing means computes the second angle after converting said two encoder signal outputs into absolute values, and which comprises quadrant discriminating means for discriminating the quadrant, whether first, second, third, or fourth, to which said first or second angle belongs, by recognizing the signs, positive or negative, of the encoder signal outputs, and data quadrant converter means for converting the second angle calculated by said angle computing means into an angle in said discriminating quadrant.

9. An angle data computation apparatus for an encoder according to claim 8, wherein the angle error data stored in said angle error data storage means includes only those data obtained when the second angle ranges from 0 to π/4, and which comprises a means for obtaining the angle error corresponding to the second angle based on the storage angle error data for the range of 0 to π/4 for the second angle when the second angle ranges from π/4 to π2.

* * * * *

UNITED STATES PATENT AND TRADEMARK OFFICE
CERTIFICATE OF CORRECTION

PATENT NO. : 5,786,781
DATED : July 28, 1998
INVENTOR(S) : Taniguchi et al.

It is certified that error appears in the above-indentified patent and that said Letters Patent is hereby corrected as shown below:

Cover Page, "FOREIGN PATENT DOCUMENTS", add the following:
-- 3231990   3/1984   Germany --.

Col. 1,   line 3, change "TECHNICAL FIELD" to --FIELD OF THE INVENTION--;

line 10, change "BACKGROUND ART" to --DESCRIPTION OF THE RELATED ART--;

lines 29, 32, 37, 42, 43, 47 and 49, change "means" to --unit--.

Col. 2,   line 10, change "DISCLOSURE" to --SUMMARY--;

lines 7, 9, 17, 27, 31 and 33, change "means" to --unit--.

Col. 3,   lines 27 and 30, change "means" to --unit--;

lines 32 and 33,   change "BEST MODE OF CARRYING OUT THE INVENTION" to --DESCRIPTION OF THE PREFERRED EMBODIMENTS--.

UNITED STATES PATENT AND TRADEMARK OFFICE
CERTIFICATE OF CORRECTION

PATENT NO. : 5,786,781
DATED : July 28, 1998
INVENTOR(S) : Taniguchi et al.

It is certified that error appears in the above-indentified patent and that said Letters Patent is hereby corrected as shown below:

Col. 4, lines 34 (both occurrences), 35,37,38,43, and 52 (both occurrence). change "means" to --unit--.

Col. 6, lines 14,17,19,37,38,40,48,50,54,57,61,63, and 66. change "means" to --unit---.

Col. 7, line 10, change "means" to --unit--.

Signed and Sealed this

Sixth Day of April, 1999

Attest:

Attesting Officer

Q. TODD DICKINSON

Acting Commissioner of Patents and Trademarks